(12) United States Patent
Gisolfi et al.

(10) Patent No.: US 12,455,800 B2
(45) Date of Patent: Oct. 28, 2025

(54) DYNAMIC TESTING WITH CAPTURED SEQUENCES OF EVENTS

(71) Applicant: International Business Machines Corporation, Armonk, NY (US)

(72) Inventors: Daniel Nicolas Gisolfi, Hopewell Junction, NY (US); Andrew C. M. Hicks, Highland, NY (US); Tyler Vezio Rimaldi, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/499,392

(22) Filed: Nov. 1, 2023

(65) Prior Publication Data

US 2025/0138965 A1    May 1, 2025

(51) Int. Cl.
G06F 11/00 (2006.01)
G06F 11/22 (2006.01)

(52) U.S. Cl.
CPC ................. G06F 11/2273 (2013.01)

(58) Field of Classification Search
CPC ............. G06F 11/2273; G06F 11/3692; G06F 11/3688; G06F 2201/835
USPC ....................................................... 714/1–57
See application file for complete search history.

(56) References Cited

U.S. PATENT DOCUMENTS

| | | | |
|---|---|---|---|
| 10,212,226 B2 | 2/2019 | Johnson | |
| 10,389,647 B2 | 8/2019 | Spiker et al. | |
| 10,552,138 B2 | 2/2020 | Smith et al. | |
| 10,621,049 B1 | 4/2020 | Certain et al. | |
| 10,997,207 B2 | 5/2021 | Robinson et al. | |
| 11,461,365 B2 | 10/2022 | Koorapati et al. | |
| 11,615,867 B2 | 3/2023 | Lafon | |
| 11,630,845 B2 | 4/2023 | Dageville et al. | |
| 11,669,544 B2 | 6/2023 | Goldberg et al. | |
| 2010/0251031 A1 | 9/2010 | Nieh et al. | |
| 2010/0268991 A1* | 10/2010 | Birch | H04L 65/1104 709/227 |
| 2014/0025997 A1* | 1/2014 | Heiper | G06F 11/3676 714/38.1 |
| 2015/0261657 A1* | 9/2015 | Kommineni | G06F 11/3684 714/38.1 |
| 2015/0347278 A1* | 12/2015 | Sinha | G06F 11/3684 714/38.1 |

(Continued)

OTHER PUBLICATIONS

Wilhelm et al.; "A Probabilistic Dynamic Clock Set To Capture Message Causality", HAL Open Science, HAL ID: hal-03984499, pp. 1-12, Feb. 18, 2023.

(Continued)

*Primary Examiner* — Sarai E Butler
(74) *Attorney, Agent, or Firm* — Patterson + Sheridan, LLP

(57) ABSTRACT

Method and apparatus for regression testing. A first plurality of sequences of events is generated by executing a plurality of test paths on a first computing environment. A test workload is constructed based on the first plurality of sequences of events. A second plurality of sequences of events is generated by executing the test workload on a second computing environment. One or more variances are identified by comparing the first plurality of sequences of events with the second plurality of sequences of events. And the second computing environment is reconfigured based on the one or more variances.

18 Claims, 8 Drawing Sheets

(56) References Cited

U.S. PATENT DOCUMENTS

| | | | |
|---|---|---|---|
| 2016/0140016 A1* | 5/2016 | Li | G06F 11/3612 |
| | | | 714/38.1 |
| 2018/0101546 A1* | 4/2018 | Krasnow | G06F 16/1734 |
| 2018/0173617 A1 | 6/2018 | Tian | |
| 2019/0140819 A1 | 5/2019 | Dolev | |
| 2019/0377622 A1* | 12/2019 | Kurian | G06F 11/0775 |
| 2020/0119971 A1* | 4/2020 | Healey | H04L 41/065 |
| 2020/0125465 A1* | 4/2020 | Choi | G06N 3/047 |
| 2021/0311858 A1* | 10/2021 | Rakhmilevich | G06F 11/3698 |
| 2022/0334894 A1 | 10/2022 | Motazedi et al. | |
| 2022/0405178 A1 | 12/2022 | Zhang et al. | |
| 2022/0414577 A1* | 12/2022 | Patel | G06Q 10/06312 |
| 2024/0104007 A1* | 3/2024 | Joshi | G06F 11/3684 |

OTHER PUBLICATIONS

Tobias, Landes; "Dynamic Vector Clocks For Consistent Ordering Of Events In Dynamic Distributed Applications", PDPTA Inter. Conf. On, vol. 1, pp. 31-37, Jun. 26-29, 2006.

Meng et al.; "Distributed System Fuzzing", Cornell University Library, arXiv:2305.02601v1, pp. 1-14, May 4, 2023.

Rombola et al.; "Incorporation The Concept Of Priority Into Lamport Timestamps To Prevent Starvation in Systems That Use Timestamps For Concurrency Control", EasyChair Preprint, No. 3097, pp. 1-5, Apr. 1, 2020.

Daharmawardena et al.; "Cluster Head Selection Based Routing Protocol For VANET Using Bully Algorithm And Lamport Timestamp", IJCTE International Journal Of, vol. 9, No. 3, pp. 218-222, Jun. 2017.

Leslie Lamport, "A.M. Turing Award Laureate," ACM Awards, Year: 2013, pp. 1-6.

Leslie Lamport, "Time, Clocks, and the Ordering of Events in a Distributed Systems," Communications of the ACM, vol. 21, No. 7, Dated: Jul. 1978, pp. 558-565.

International Searching Authority, "Notification of Transmittal of the International Search Report and the Written Opinion of the International Searching Authority, or Declaration," Patent Cooperation Treaty, Apr. 7, 2025, 109pages, International Application No. PCT/ EP2024/080489.

* cited by examiner

DYNAMIC TESTING WITH CAPTURED SEQUENCES OF EVENTS

BACKGROUND

The present disclosure relates to regression testing, and more specifically, to streamlining the testing process by capturing sequences of events and dynamically replaying the captured sequences of events in a new computing system.

Regression testing is an important practice in the development and maintenance of production computing systems. The main purpose of regression testing is to evaluate a system's functionality, and to ensure cohesive operation across all components, particularly after modifications or updates to the system (or to any components therein). With the advent of multi-service and distributed computing architectures, the complexity of regression testing has intensified.

Distributed systems, which are spread across various machines or nodes, rely on the coordination of numerous components, applications, and services to ensure that each part functions as intended within this complex network. Such an environment demands well-designed test suites capable of detecting unexpected behaviors, pinpointing bottlenecks, and evaluating resource utilization under different workloads. Although full system tests are a standard approach in the industry today, there are significant challenges, including the lack of machine-driven automated testing mechanisms that can simulate real-world user workloads effectively.

Current end-to-end testing predominantly relies on one of two methods: heavy dependence on human testers for workload simulation, or the use of randomized interactions through automation. The former, while offering a human touch, can be time-consuming, is susceptible to human errors, and lacks the scalability and repeatability inherent to automated tests. On the other hand, while the randomized interactions generated through automation can cause numerous interactions without human intervention, the nature of generated interactions—being random—might not accurately simulate real-world usage patterns. As a result, the second method leads to potentially unrepresentative or incomplete testing results, rendering the testing less effective in capturing real-world issues.

SUMMARY

One embodiment presented in this disclosure provides a method, including generating a first plurality of sequences of events by executing a plurality of test paths on a first computing environment, constructing a test workload based on the first plurality of sequences of events, generating a second plurality of sequences of events by executing the test workload on a second computing environment, identifying one or more variances by comparing the first plurality of sequences of events with the second plurality of sequences of events, and reconfiguring the second computing environment based on the one or more variances.

Other embodiments in this disclosure provide non-transitory computer-readable mediums containing computer program code that, when executed by operation of one or more computer processors, performs operations in accordance with one or more of the above methods, as well as systems comprising one or more computer processors and one or more memories containing one or more programs that, when executed by the one or more computer processors, perform an operation in accordance with one or more of the above methods.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DETAILED DESCRIPTION

Figure 1:
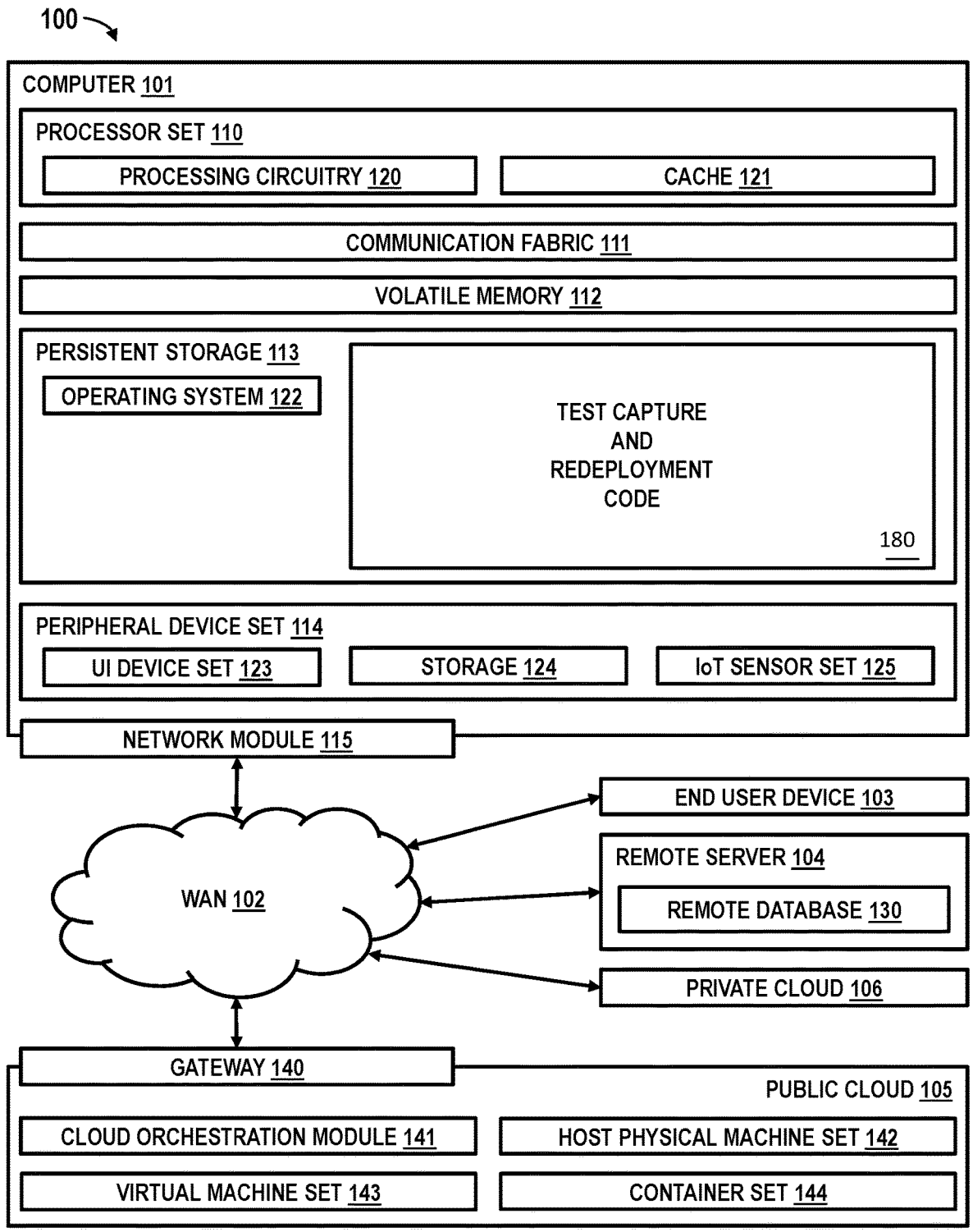
FIG. 1 depicts an example computing environment for the execution of at least some of the computer code involved in performing the inventive methods.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure provides techniques for implementing a machine-driven mechanism to automate regression testing in a multi-service distributed computing system. Instead of relying on human-driven testing, the machine-driven mechanism is specifically designed to simulate the inherent complexities associated with testing in these multi-service distributed infrastructures. The present disclosure aims to enhance the accuracy, efficiency and scalability of regression testing, to ensure these complex systems are exhaustively tested to meet demands from real-world scenarios.

In one embodiment, human testers may initiate a variety of test cases in a first computing system (also referred to in some embodiments as a reference system or a baseline system). Each test case, which refers to a condition (or a set of conditions) used to determine if a system works correctly, may result in one or more unique test paths. Each test path may represent the actual sequence of codes or instructions executed during runtime due to the specific input (or set of inputs) from the test case. Each test path may include a sequence of events or interactions within the system, and each interaction is captured and recorded with its corresponding logic/Lamport timestamp. In the configuration described above, based on these logic/Lamport timestamps, a binary tree (also referred to in some embodiments as Lamport tree) may be created for each test path, which captures the causal relations and sequences of events or interactions associated with each test path.

In the configuration described above, the testing system may create a detailed test workload using these Lamport trees, and introduce the test workload to a second computing system (also referred to in some embodiments as a new computing system) for re-execution. In the second computing system, the sequences of events or interactions may be captured again, along with a new set of logic/Lamport timestamps. In some embodiments, when the tests on the second computing system are completed, the Lamport timestamps from both computing systems may be compared to generate one or more Lamport time variances (e.g., micro Lamport variance and/or macro Lamport variance, as discussed in more detail below). Using the Lamport time variances, in some embodiments, the testing system may evaluate potential overfitting and/or underfitting between the two computing systems, and undertake further analyses to understand the performance and functionality of the new computing system.

FIG. 1 depicts an example computing environment for the execution of at least some of the computer code involved in performing the inventive methods.

Computing environment 100 contains an example of an environment for the execution of at least some of the computer code involved in performing the inventive methods, such as Test Capture and Redeployment Code 180. In addition to Test Capture and Redeployment Code 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and Test Capture and Redeployment Code 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in Test Capture and Redeployment Code 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in Test Capture and Redeployment Code 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
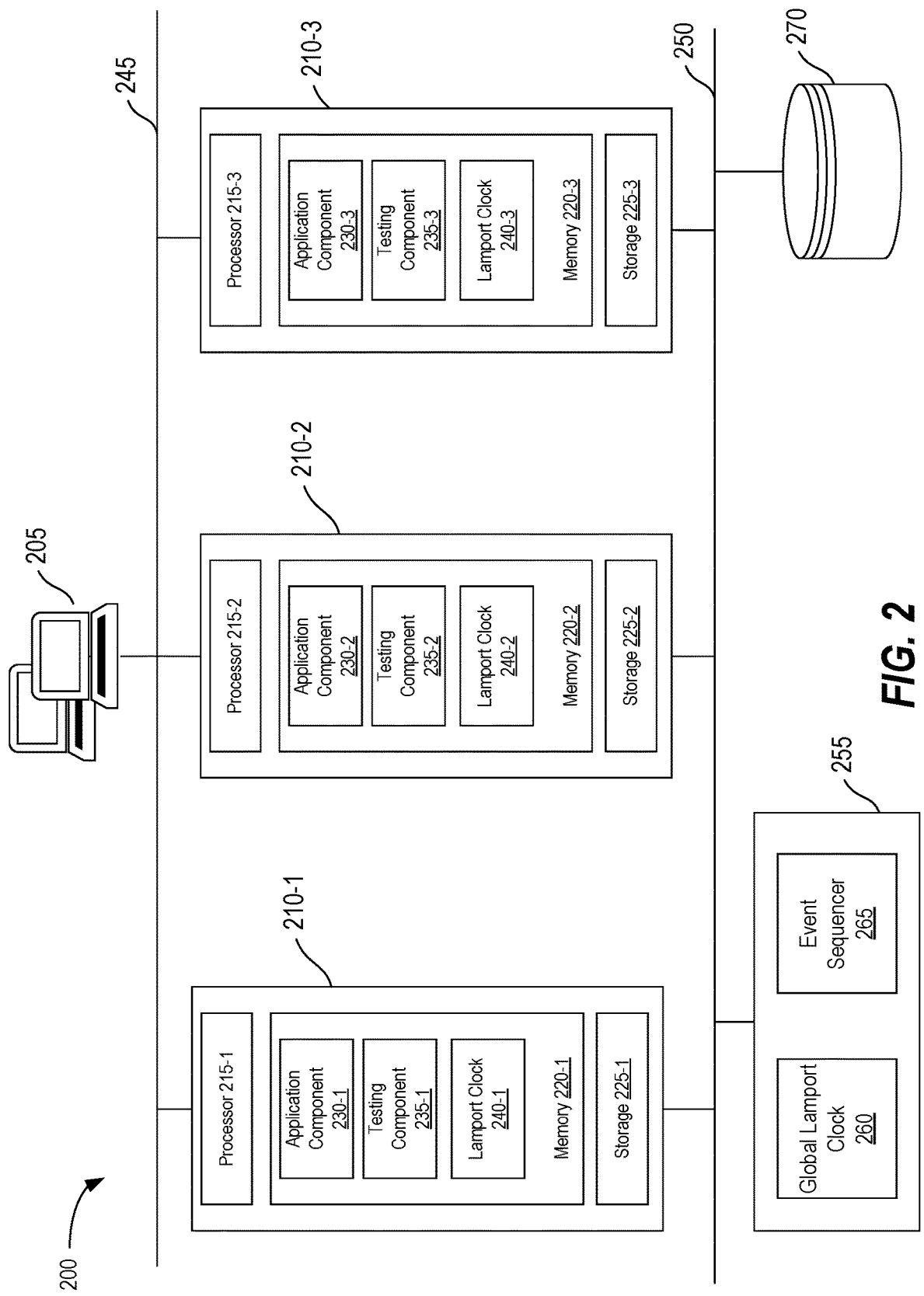
FIG. 2 depicts an example architecture of a distributed system utilizing one embodiment of the present disclosure.

FIG. 2 depicts an example architecture of a distributed system 200 utilizing one embodiment of the present disclosure. In the illustrated example, the system 200 includes one or more client devices 205 communicatively coupled to a cluster of nodes 210-1, 210-2 and 210-3, a shared database 270, and a middleware 255 for coordinating global Lamport timestamps and logging sequences of events or interactions.

In the illustrated example, the client devices 205 represent an entry point into the distributed system 200, and can be any computing devices capable of communicating with one or more nodes 210-1, 210-2 and 210-3 in the system to initiate a test. In some embodiments, the client devices 205 may correspond to conventional computing devices, such as laptops, desktops, tablets, and smart phones. In some embodiments, the client devices 205 may correspond to specialized devices, such as Internet-of-Things (IOT) sensors, embedded systems, and network applications, provided that they have the necessary software and network capabilities to interface with the distributed system. In some embodiments, the client devices 205 may each include one or more CPUs, one or more memories, one or more storages, one or more network interfaces, and/or one or more I/O interfaces, where the CPU may retrieve and execute programming instructions stored in the memory, as well as store and retrieve application data residing in the storage. As illustrated, the client devices 205 connect to the nodes 210 through network connections 245, which enable seamless communication and interaction. The network connections 245 allow the client device 205 to initiate tests and interact with the distributed system to collect necessary information (e.g., Lamport trees, sequences of interactions with Lamport timestamps) for further analysis.

In the illustrated example, the nodes 210-1, 210-2 and 210-3 in the distributed system 200 can be any type of computing device, ranging from traditional servers in a data center to cloud-based virtual machines, edge devices, and/or workstations. These nodes 210-1, 210-2 and 210-3 cooperate with each other to provide a seamless service to end users. In the illustrated example, the nodes 210-1, 210-2 and 210-3 connect to the shared database 270 and the middleware 230 via network connections 250. In some embodiments, the network connections 245 and 250 may include or correspond to a wide area network (WAN), a local area network (LAN), the Internet, an intranet, or any combination of suitable communication mediums that may be available, and may include wired, wireless, or a combination of wired and wireless links. The network connections 245 and 250 may provide connectivity for the various systems, components, or resources within the distributed system 200, and may be implemented using protocols such as Transmission Control Protocol (TCP) and/or Internet Protocol (IP). In some embodiments, the client devices 205, the nodes 210, the shared database 270, and the middleware 255 may be local to each other (e.g., within the same local network and/or the same hardware system), and communicate with one another using any appropriate local communication medium, such as a local area network (LAN) (including a wireless local area network (WLAN)), hardwire, wireless link, or intranet, etc. In some embodiments, one or more of the client devices 205, the nodes 210, the shared database 270, and the middleware 255 may be remote from each other (e.g., located in different geographical locations), and communicate with one another using any appropriate communication medium, such as a wide area network (WAN) or the Internet.

In some embodiments, one or more of the client devices 205 may initiate test case(s) and provide the relevant inputs or parameters for the test(s). Upon receiving the test command and its associated parameters, the nodes 210-1, 210-2, and 210-3 may execute the testing operations collaboratively. In the illustrated example, each node (e.g., 210-1) comprises three components: a processor (e.g., 215-1), a memory (e.g., 220-1) and a storage (e.g., 225-1). In some embodiments, the memory may be any type of volatile memory, such as dynamic random access memory (RAM) or static RAM. As illustrated, the memory (e.g., 220-1) serves as the temporary storage medium for the active execution of various components within the node. Specifically, in the illustrated example, the memory contains the program codes for the application component (e.g., 230-1), the testing component (e.g., 235-1), and the Lamport clock (e.g., 240-1). During runtime, the processor (e.g., 215-1) may access and execute the programming instructions stored in the memory (e.g., 220-1), as well as store and retrieve application data residing in the storage (e.g., 225-1).

In some embodiments, the application component (e.g., 230-1) may contain the software (e.g., program codes) that provides the primary functionalities or services that the node is designed to provide. The application component (e.g., 230-1) may process data, handle main tasks, and manage interactions with other components within the distributed system (e.g., other nodes, or client devices). The application component (e.g., 230-1) may ensure that the node delivers its intended service to users or other components.

In some embodiments, the testing component (e.g., 235-1) may include program instructions specifically designed to evaluate the performance, reliability, and functionality of the application component (e.g., 230-1) when executing test cases on it. The testing component (e.g., 235-1) may execute predefined test cases, simulate user behaviors, and generate corresponding testing results. In some embodiments, the testing results may be further analyzed to identify potential issues, bottlenecks, or defects in the application component.

In some embodiments, the local Lamport clock (e.g., 240-1) may use the Lamport clock algorithm to order events in the distributed system. The local Lamport clock (e.g., 240-1) may generate a Lamport timestamp for each event or interaction occurring within the node (e.g., 210-1) and maintain its own local timestamp (e.g., saved in storage 225-1). When a node (e.g., 210-1) communicates with another node (e.g., 210-2) within the distributed system, it may send its current local timestamp along with the message. Upon receiving the message with the timestamps from another node, the receiving node (e.g., 210-2) may update its local timestamp to be the maximum of its current timestamp and the received timestamp (e.g., from 210-1), plus one.

Figure 3:
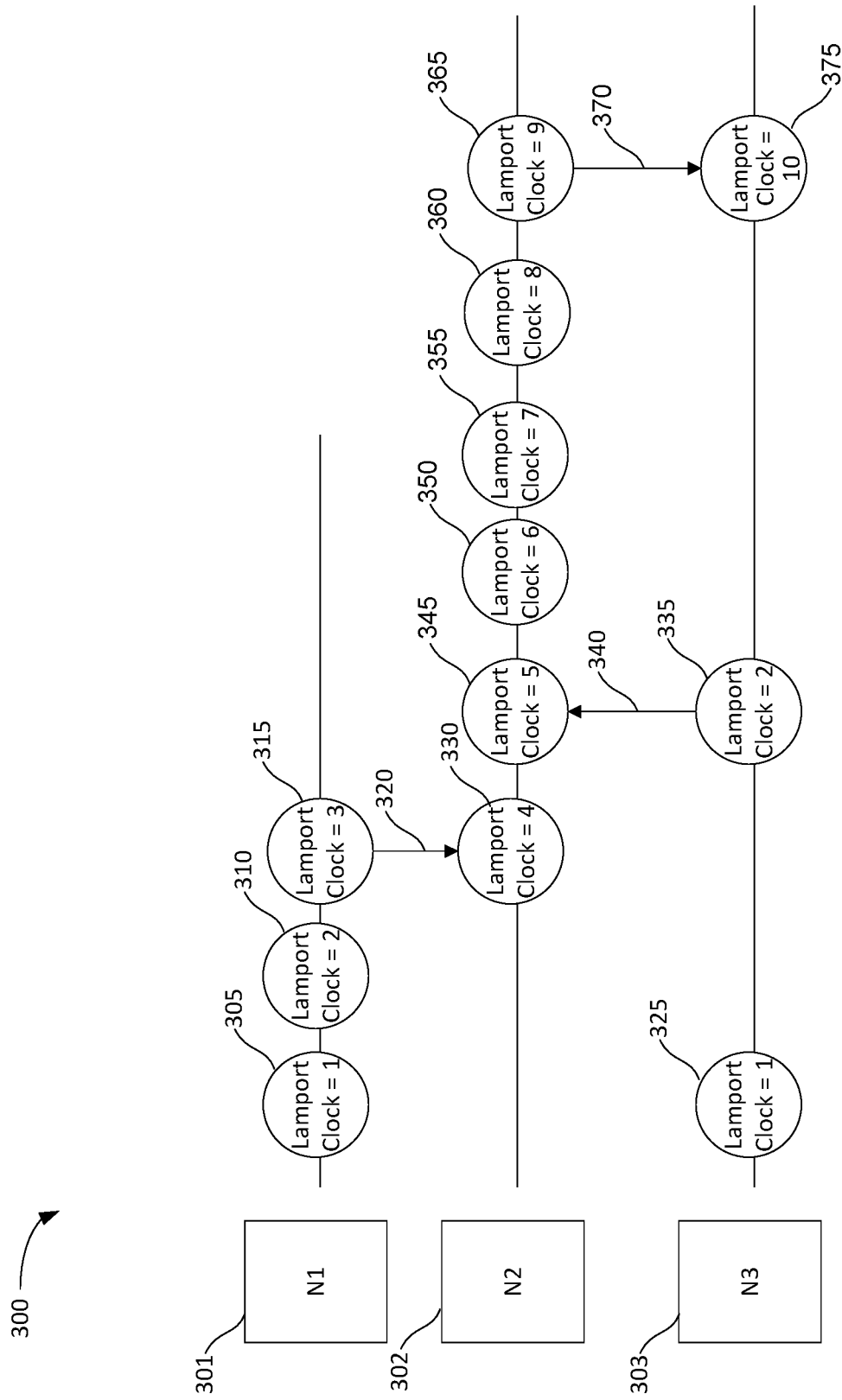
FIG. 3 depicts a time diagram for a sequence of events among three nodes with Lamport timestamps, according to some embodiments of the present disclosure.

In the illustrated example, the middleware 255 includes a global Lamport clock 260, and an event sequencer 265. In some embodiments, the global Lamport clock 260 may communicate with each node (e.g., 210-1, 210-2, and 210-3) via the network connections 250. During the execution of a test case, the global Lamport clock 260 may synchronize with the local Lamport clock within each node to generate a unified and system-wide Lamport timestamp diagram (as depicted in FIG. 3). The diagram visually represents the overall sequence of events across the system, and each event is marked with a corresponding Lamport timestamp. For example, in the diagram, when node 210-1 sends a message to node 210-2, the local Lamport timestamp of node 210-1 is marked as "1," and upon receiving the message, the local Lamport timestamp of node 210-2 is updated to "2." More detail is discussed below with reference to FIGS. 3 and 5.

In some embodiments, the event sequencer 265 may be configured to capture the sequence of events or interactions that occur during the execution of a specific test case (e.g., resulting a unique test path). In some embodiments, by monitoring these events and the updated Lamport timestamps within each node, the event sequencer 265 may construct a binary tree (also referred to in some embodiments as a Lamport tree) for each test path, which provides a structured representation of these events or interactions and their causal order. In some embodiments, for different test paths, their respective binary trees may be edited, trimmed, and/or combined to create a test workload that includes various testing scenarios and interaction patterns. In some embodiments, with each test path of interactions represented as a single Lamport tree, a vast recording of such paths is generated. When constructing the test workload, in some embodiments, these unique or dense paths may be identified and pruned to improve testing efficiency. In some embodiments, similar path may be condensed to eliminate redundancy. The various techniques may be used to edit and combine the binary trees for different test path, to create a custom and reproducible test workload. In some embodiments, the custom and reproducible workload is designed to stress a new computing system more accurately and effectively, reflecting the intricacies of real-world user behaviors. After the test workload is defined, in some embodiments, the test workload may be replayed in a new computing environment. The replay of test workload may simulate real-world user behavior, to evaluate the performance of the new computing system under a variety of conditions, all without (or with reduced) human intervention or manual testing.

Figure 5:
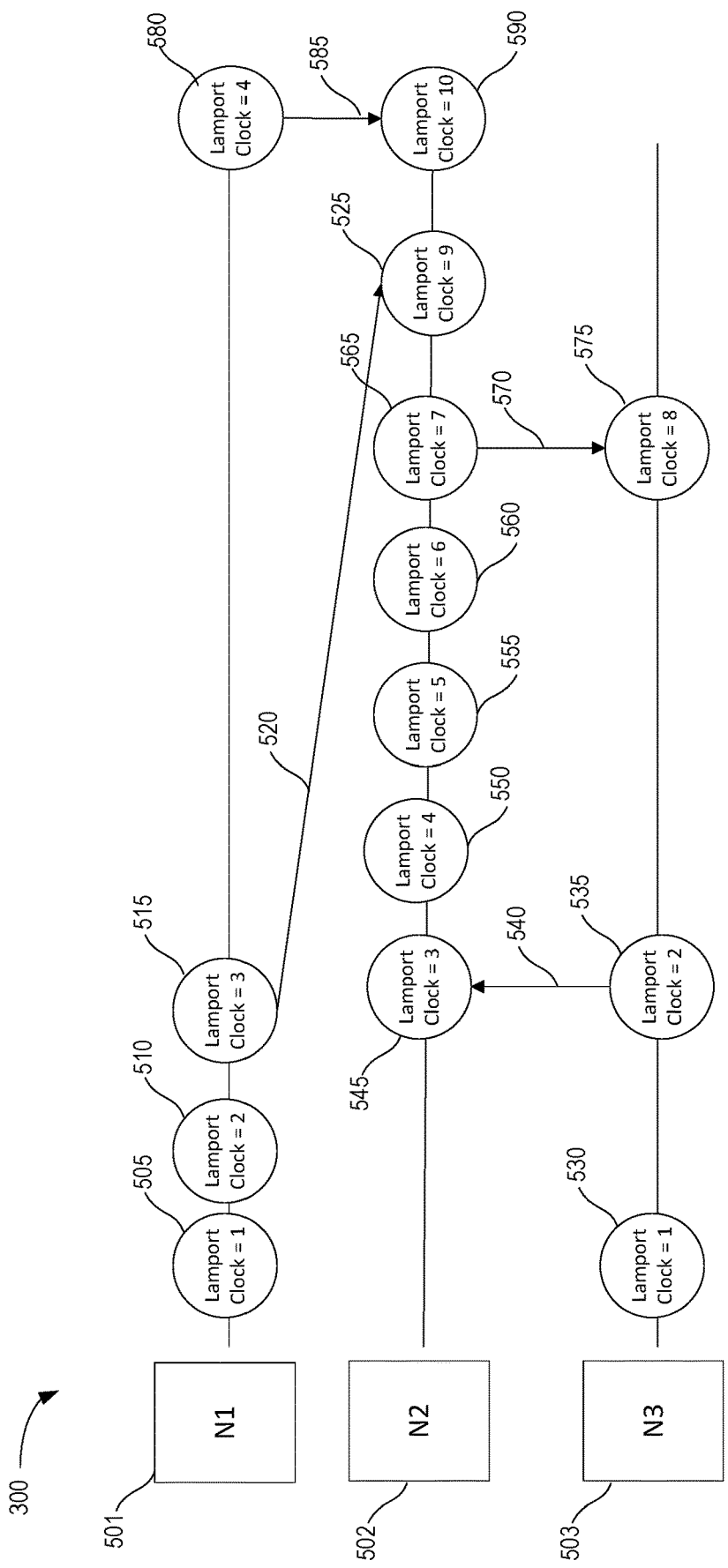
FIG. 5 depicts a time diagram for replaying a test workload in a new computing system, according to some embodiments of the present disclosure.

In some embodiments, the Lamport tree constructed for each test path may only capture the sequence of active events (e.g., operations like "send," "read," and "update"), and omit passive events (e.g., "receive"). In distributed system, active events may originate from the internal operations of the system or an explicit action initiated by a user. Therefore, active events are typically reproducible because they are based on the logic of the application or the direct behavior of the user. On the other hand, passive events, such as "receive," may be influenced by various external factors (e.g., network latency, congestion, system setting, operational state of other processes), and when replayed in a new environment, reproducing the exact sequence of passive events may be challenging. By focusing on the sequence of active events, the Lamport tree may ensure that it captures a reproducible sequence of events that can be re-executed in a new computing system. In some embodiments, the re-execution of the sequence of events or interactions may simulate real-world user behaviors without (or with reduced) human intervention, and lead to a new Lamport timestamp diagram (as depicted in FIG. 5). During the re-execution, the sequence of events remains consistent, but the nodes within the new computing system may end up with Lamport timestamps that are different from those in the reference computing system. The variance in Lamport timestamps between the two diagrams may provide further insights into the behavioral and performance differences between the two computing systems. In some embodiments, the variance may serve as a diagnostic tool, helping to identify potential overfitting/underfitting between the two systems. More detail is discussed below with reference to FIG. 6.

FIG. 3 depicts a time diagram 300 for a sequence of events among three nodes with Lamport timestamps, according to some embodiments of the present disclosure.

The illustrated time diagram 300 represents three nodes within a first distributed system as N1 (e.g., node 301), N2 (e.g., node 302), and N3 (e.g., node 303). When a test case is initiated in the first distributed system, the three nodes N1, N2, and N3 interact with each other in a sequence of events to develop a unique test path, where each interaction is timestamped using a local Lamport clock (e.g., 240-1, 240-2, and 240-3 of FIG. 2). The sequence of events or interactions, along with their corresponding Lamport timestamps, are captured and recorded in the illustrated time diagram 300.

In this illustrated time diagram, N1 starts by reading a value (e.g., read x=10 from memory or storage), which causes its Lamport clock to increment to 1 (as depicted by Lamport timestamp 305). At step two, N1 updates the value based on various application logic (e.g., update x=15) and its Lamport clock changes to 2 (as depicted by Lamport timestamp 310). At step three, N1 communicates the update (e.g., send x=15) to N2 (as depicted by arrow 320), and N1's Lamport clock further increments to 3 (as depicted by Lamport timestamp 315). Upon receiving the update (e.g., receive x=15) from N1, N2 adjusts its Lamport clock to 4 (as depicted by Lamport timestamp 330), which is derived from the maximum of its own clock value (0) and the received timestamp from N1 (3), plus one. Concurrently with step three, N3 makes its own update (e.g., update y=10) based on various logic, setting its Lamport clock to 1 (as depicted by Lamport timestamp 325). At step four, N3 sends a message (as depicted by arrow 340) about the update (e.g., send y=10) to N2, and N3's Lamport clock further increments to 2 (as depicted by Lamport timestamp 335). Upon receiving the update (e.g., receive y=10) from N3, N2 adjusts its Lamport clock to 5 (as depicted by Lamport timestamp 345), which is derived from the maximum of its own clock value (4) and the received timestamp from N3 (2), plus one. At step five, N2 reads the updated value of x (e.g., read x=15), and its Lamport clock changes to 6 (as depicted by Lamport timestamp 350). At step six, N2 reads the updated value of y (e.g., read y=10) from N3, and its Lamport clock changes to 7 (as depicted by Lamport timestamp 355). At step seven, N2 performs a calculation of the updated values x and y (e.g., calculate y=x+y=25), incrementing its Lamport clock to 8 (as depicted by Lamport timestamp 360). At step eight, N2 sends a message to N3 (as depicted by arrow 370), updating the value (e.g., send y=25) to N3 and incrementing its Lamport clock to 9 (as depicted by Lamport timestamp 365). N3, upon receiving the message about the update (e.g., y=25), adjusts its Lamport clock to 10 (as depicted by Lamport timestamp 375), which is derived from the maximum of its own clock value (2) and the received timestamp from N1 (9), plus one.

The illustrated time diagram captures a sequence of events or interactions among three nodes within a distributed system. The depicted system is discussed for conceptual clarity. In some embodiments, a distributed system may include any number of nodes interacting within the scope of a triggered test case (including one).

Figure 4:
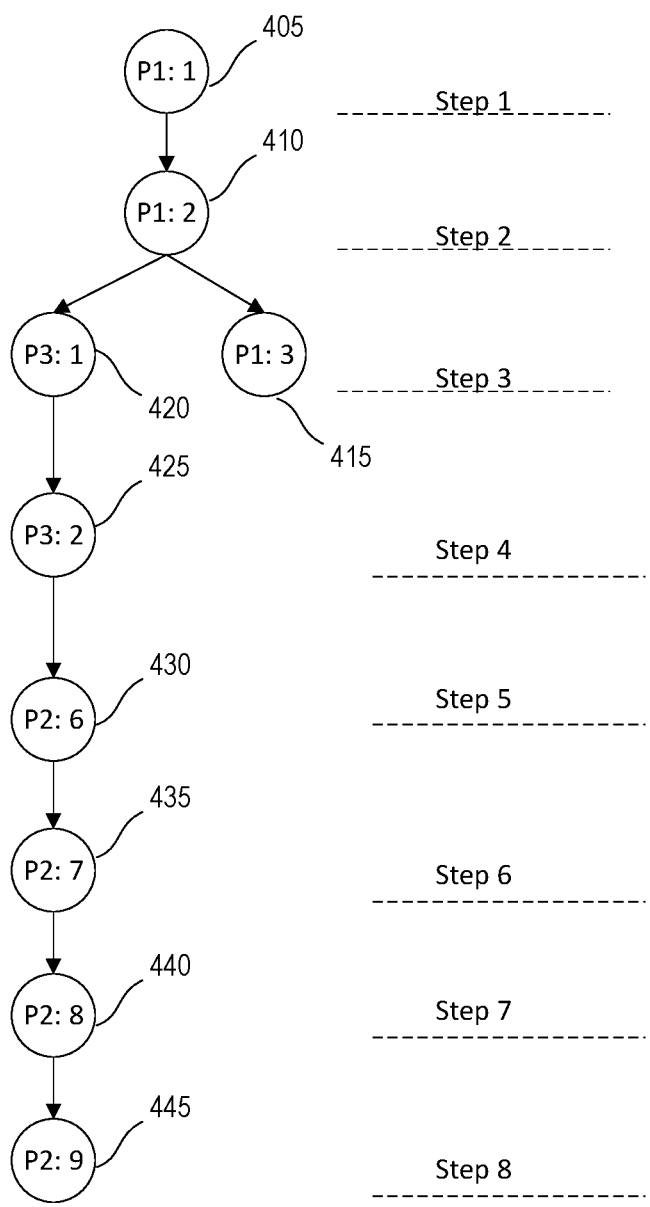
FIG. 4 depicts a Lamport tree for a sequence of events among three nodes, according to some embodiments of the present disclosure.

FIG. 4 depicts a Lamport tree 400 for a sequence of events among three nodes, according to some embodiments of the present disclosure.

The illustrated Lamport tree 400 captures the causal relations and order of events or interactions for a test path executed in the first computing system (as depicted in FIG. 3). In some embodiments, the Lamport tree constructed for a test path may capture the causal relations and order of all types of events or interactions, including both active and passive events.

In the illustrated example, only active events or interactions (e.g., operations such as "read," "update," "send," and "calculate") are recorded. Passive events or interactions among the three nodes (e.g., operations such as "receive") are omitted. By focusing on the sequence of active actions, the Lamport tree may ensure that it captures a reproducible sequence of events that can be re-executed in a new computing system. In the construction of a Lamport tree, the positioning of actions indicates their temporal relationships. Actions that occurred concurrently, without a clear order between them, are placed on the same level of the tree. For example, the node 420, which depicts that N3 updates its value (e.g., update y=10) and increments its Lamport Clock to 1 (Lamport clock=1) is placed on the same level as the leaf node 415, which depicts that N1 sends a message (e.g., send x=15) to N2 and increments its Lamport clock to 3 (Lamport clock=3). Conversely, actions that occur one after another are placed vertically in the tree. For example, the action at step one involves that N1 reads a value (e.g., read x=10) and increments its Lamport clock to 1 (Lamport clock=1). The action at step one is represented by root node 405. The action at step one is followed by another action at step two, where N1 updates a value (e.g., update x=15) and increments its Lamport clock to 2 (Lamport clock=2). The action at step two is represented by node 410, and placed below root node 405. Similarly, the action at step four follows the action at step three (represented by node 420), which involves that N3 sends a message about the update (e.g., update y=10) to N2, and further increments its Lamport clock to 2 (Lamport clock=2). The action at step four is represented by node 425, and placed at a lower level below node 420. Following the action at step four, the action at step five is represented by node 430 (positioned below node 425), which includes that N2 reads the updated value (e.g., read x=15) from N1, and sets its Lamport clock changes to 6 (Lamport clock=6). The action at step six is represented by node 435 (positioned below node 430), which involves that N2 reads the updated value (e.g., y=10) from N3, and sets its Lamport clock to 7 (Lamport clock=7). The node 440 represents the action at step seven, where N2 adds the updated x and y together (e.g., y=x+y=25), incrementing its Lamport clock to 8 (Lamport clock=8). Since the action at step seven occurs following the action at step six, the node 440 is placed below node 435. The leaf node 445 represents the action at step eight where N2 sends a message to N3, updating the value (e.g., y=25) to N3 and incrementing its Lamport clock to 9 (Lamport clock=9). Since the action at step eight occurs after the action at step seven, leaf node 445 is positioned below node 440.

The illustrated example depicts the construction of a Lamport tree for a test path involving interactions among three distinct nodes. The depicted Lamport tree is discussed for conceptual clarity. In some embodiments, a distributed system may include any number of nodes interacting within the scope of a test path (including one).

In some embodiments, multiple test cases may be initiated in the first distributed computing system. For each unique test path that emerges, a corresponding Lamport tree is generated to capture the sequence of events or interactions occurring within the first distributed computing system. In the illustrated example, a test workload for a new computing system is generated based on a single Lamport tree 400. The depicted test workload is discussed for conceptual clarity. In some embodiments, a test workload for a new computing system may be generated based on more than one Lamport trees 400. In some embodiments, Lamport trees developed from different test paths may be edited, trimmed, or aggregated to fabricate a test workload. When the test workload is executed in the new computing system, it may simulate real-world use behaviors and generate corresponding testing results for the new computing system.

FIG. 5 depicts a time diagram 500 for replaying a test workload in a new computing system, according to some embodiments of the present disclosure.

In the illustrated example, a test workload for a new computing system is generated based on a single Lamport tree (e.g., 400 of FIG. 4). In some embodiments, a test workload for a new computing system may be generated based on more than one Lamport trees. In some embodiments, the Lamport tree captures the sequence of events or interactions captured within the Lamport tree for each test path when executed in the first computing system. In the illustrated example, the test workload is re-executed in a second computing system. The second computing system comprises three nodes, depicted as N1 (e.g., node 401), N2 (e.g., node 402), and N3 (e.g., node 403) in the illustrated time diagram 500. This re-execution, however, results in nodes being stamped with different Lamport timestamps compared with their counterparts in the first computing system. For example, node N1 in the second computing system is stamped with Lamport value 4, node N2 is stamped with Lamport value 10, and node N3 is stamped with Lamport value 8. The discrepancies in the timestamps may be caused by a variety of factors, such as network latency, different system configurations and processing speeds, interference from other concurrent operations in the new system, or interactions with external systems or services. More detail is discussed below.

In the illustrated example, the sequence of events captured by the Lamport tree 400 is followed during the re-execution. The sequence starts at N1, which reads a value (e.g., read x=10) and increments its Lamport clock to 1 (as depicted by Lamport timestamp 505). At step two, N1 undertakes an update operation, (e.g., update x=15) and increments its Lamport clock to 2 (as depicted by Lamport timestamp 510). Subsequently, at step three, N1 transmits a message to N2

(as depicted by arrow 520), indicating its recent update (e.g., send x=15), setting its Lamport clock to 3 (as depicted by Lamport timestamp 515). However, due to factors like network latency or system processing delays, N2 does not immediately receive the message. Concurrently with step three, N3 begins its operation by updating a different value y (e.g., update y=10) and incrementing its Lamport clock to 1 (as depicted by Lamport timestamp 530). Following the action at step three, N3 then sends a message to N2 at step four, providing details about the update (e.g., send y=10) and setting its Lamport clock to 2 (as depicted by Lamport timestamp 535). The message from N3, unlike the message from N1, is not delayed. Therefore, N2, on the receiving end, first receives the message from N3 (e.g., receive y=10). Given the Lamport clock rules and the incoming message's timestamps, N2 sets its clock to 3 (as depicted by Lamport timestamp 545). At step five, N2 reads the value x. However, because the message from N1 about the updates (e.g., update x=15) is delayed, N1 reads the old value of x (e.g., read x=10) and increments its clock to 4 (as depicted by Lamport timestamp 550). At step six, N2 reads the updated value of y (e.g., read y=10) and increases its clock to 5 (as depicted by Lamport timestamp 550). At step seven, N2 calculates the value y as the sum of the old value of x and the updated value of y (e.g., calculate y=x+y=20), setting its clock to 6 (as depicted by Lamport timestamp 560). Here, due to the delayed message from N1 to N2, the calculation is performed before the delayed message is received, which therefore disrupts the overall sequence of events. At step eight, N2 sends a message to N3 (as depicted by arrow 570), updating the value (e.g., send y=20) to N3 and incrementing its Lamport clock to 7 (as depicted by Lamport timestamp 565). N3, upon receiving the message, increments its clock to 8 (as depicted by Lamport timestamp 575). After N2 completes the calculation and even communicates with N3, the delayed message from N1 to update the value of x (e.g., send x=15) (as depicted by arrow 520) is received, and N2's Lamport clock further increments to 9 (as depicted by Lamport timestamp 525). This sequence deviation, caused by external factors such as network conditions and/or system configurations, results in variances in Lamport timestamps. For example, nodes N1, N2, and N3 in the first computing system are stamped with Lamport values of 3, 9, and 10, respectively. However, when the same sequence of events is replayed in the second computing system, external factors disrupt the time and causality of events. As a result, the nodes N1, N2, and N3 in the second computing system end up with altered Lamport values of 3, 9, and 8, respectively.

Variances in Lamport timestamps may further increase when specific error-checking mechanisms are triggered. In the illustrated example, N1 has an error-checking mechanism to monitor the delay in message transmission. When N1 determines the delay exceeds a predetermined threshold, N1 takes a corrective action by resending a message about the updated value of x to N2 (e.g., send x=15) (as depicted by arrow 585). This process of resending causes an additional increment in N1's clock, changing it to 4 (as depicted by Lamport timestamp 580). N2, upon receiving the resending message, adjusts its clock to 10 (as depicted by Lamport timestamp 590), which is derived from the maximum of its own clock value (9) and the received timestamp from N1 (4), plus one. As a result, the nodes N1, N2, and N3 in the second computing system are stamped with Lamport values of 4, 10, and 8, respectively. The error checking mechanism is essential for maintaining data integrity and ensuring secured message delivery, but can introduce additional complexity and variances to system testing.

In the illustrated example, a test workload for the second computing system is generated based on the Lamport tree 400 that captures the sequence of events or interactions in the first computing system. The generation of a test workload from a single Lamport tree, as illustrated, is discussed for conceptual clarity. In some embodiments, multiple Lamport trees may be generated (and saved in storage), each representing a test path developed within the first computing system. In some embodiments, the test workload may be a combination of various trees. In some embodiments, when constructing the test workload, certain unique paths (or leaf nodes), which correspond to distinct test paths designed for specific functionalities that are not commonly shared across different systems, may be pruned, to improve efficiency during testing. In some embodiments, similar or redundant paths (or leaf nodes) may be condensed or merged, to ensure the test workload is both tailored to the testing requirements and reproducible in diverse computing environments.

Following the re-execution within the second computing system, in some embodiments, the newly generated Lamport timestamps among the three nodes may serve as valuable indicators for system analysis. These timestamps, when compared with those from the first computing system, may be further analyzed to identify potential issues, bottlenecks, or defects within the second computing system. In some embodiments, the variances between the Lamport timestamps from both systems may help to identify if one system is overfitting or underfitting the other. In some embodiments, where multiple Lamport trees are replayed in the second computing system, the variances in Lamport timestamps may be analyzed at both macro and micro levels. In some embodiments, the micro Lamport variance may refer to the timestamp deviations for a specific test path when its corresponding Lamport tree is replayed. In some embodiments, the macro Lamport variance may refer to the cumulative Lamport timestamp deviations for all test paths replayed in the second computing system, providing a system-wide view of how the second system performs against the collective test workloads.

Figure 6:
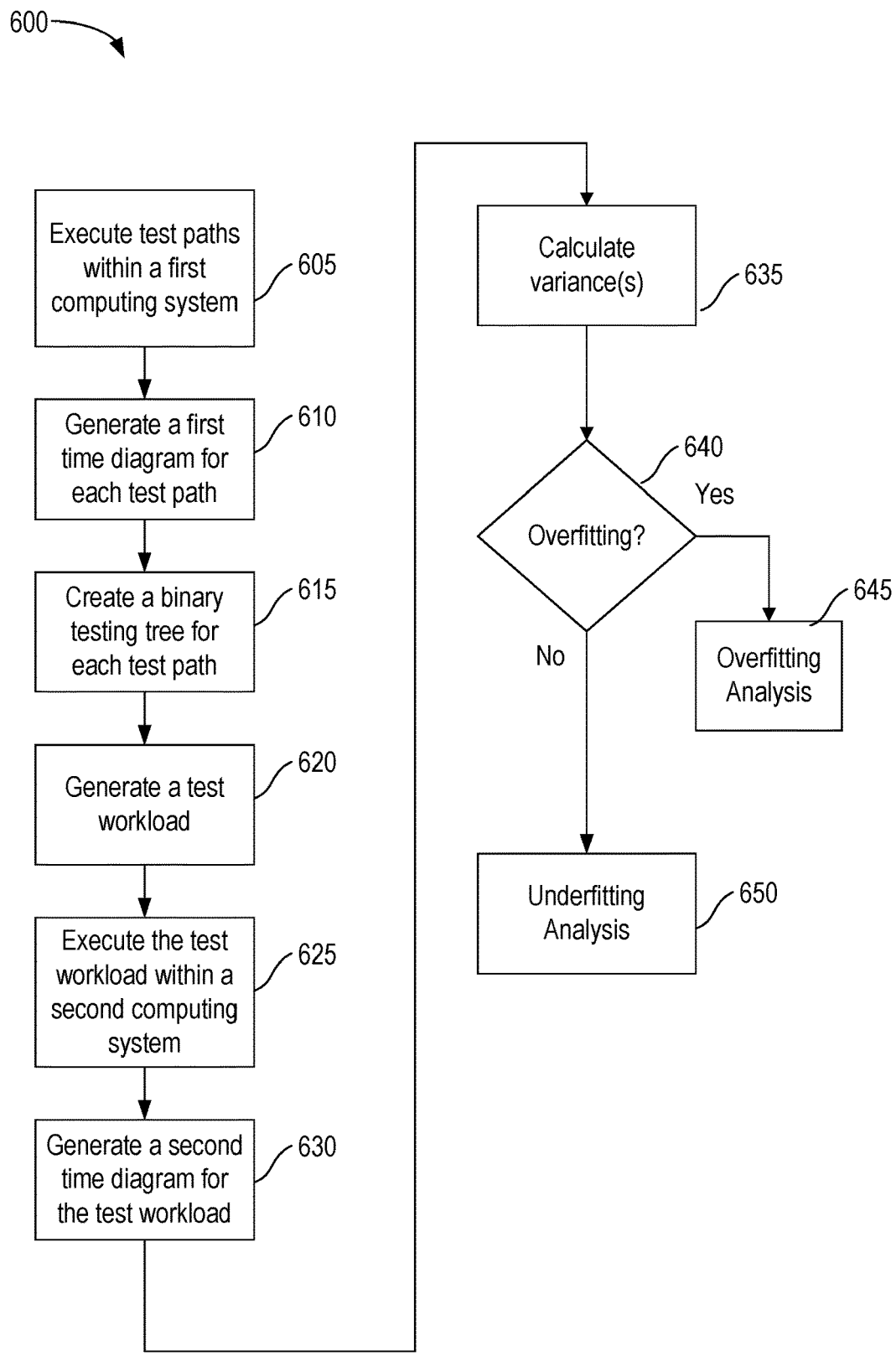
FIG. 6 depicts an example method for test event sequencing, re-executing, and analyzing, according to some embodiments of the present disclosure.
Figure 8:
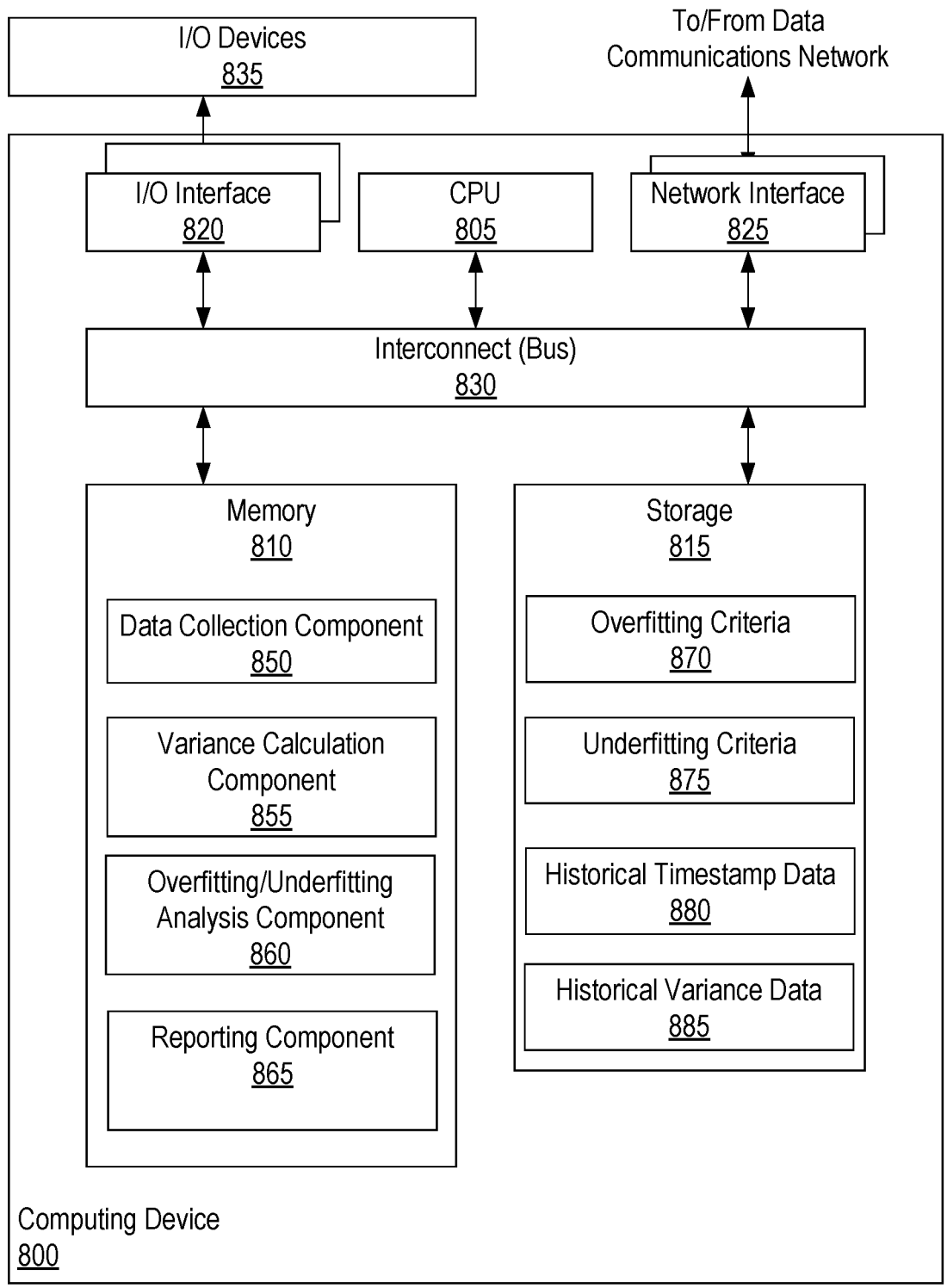
FIG. 8 depicts an example computing device configured to perform various aspects of the present disclosure, according to one embodiment.

FIG. 6 depicts an example method 600 for test event sequencing, re-executing, and analyzing, according to some embodiments of the present disclosure. In some embodiments, the method 600 may be performed by one or more computing devices, such as the computer 101 as illustrated in FIG. 1, the client device 205, the node device 210, the middleware 255 of FIG. 2, and/or the computing device 800 as illustrated in FIG. 8.

The method begins at block 605, where one or more designed test paths are executed within a first computing system (also referred to in some embodiments as the first computing environment). In some embodiments, the test paths may be designed by a human tester based on various scenarios to reflect real-world operations and workflows. In some embodiments, the first computing system may refer to a distributed system consisting of one or more nodes (e.g., 301, 302, and 303 of FIG. 3), and each test path may represent a sequence of interactions or events among these nodes in order to deliver a designed function. During the execution, each interaction is timestamped in accordance with the Lamport clock algorithm.

At block 610, for each test path that has been executed within the first computing system, a first Lamport time diagram (as depicted in FIG. 3) is generated. As discussed above, the first Lamport time diagram includes each interaction's timestamps, which reflect the causal relationship between interactions or events within the first computing system.

At block 615, based on the Lamport time diagram, the testing device creates a binary tree (also referred to in some embodiments as a Lamport tree) (as depicted in FIG. 4) for each test path. As discussed above, the binary tree reflects the causal relations and order of events or interactions within each test path, providing a clear roadmap for subsequence re-execution in a different computing system.

At block 620, a test workload is generated. As discussed above, in some embodiments, the test workload may include any number of Lamport trees (including one). When generating the test workload, certain unique and non-essential paths (or leaf nodes) may be trimmed, to improve efficiency during testing. In some embodiments, Lamport trees for different test paths may be condensed (e.g., by removing similar or redundant leaf nodes from different trees). This approach may guarantee that the final test workload is custom and reproducible in different computing environments.

At block 625, the test workload is re-executed within a second computing system (also referred to in some embodiments as the second computing environment). In some embodiments, the second computing system may refer to a distributed system consisting of one or more nodes (e.g., 210-1, 10-2, and 210-3 of FIG. 2). While the test workload provides a defined sequence of events or interactions derived from the original Lamport trees, in some embodiments, the new execution may result in variances in Lamport timestamps. Various internal factors (e.g., system configurations that influence processing speeds, interferences from other concurrent operations) or external factors (e.g., network latency) may lead to these variances.

At block 630, a second Lamport time diagram (as depicted in FIG. 5) is generated. As discussed above, within the second Lamport time diagram, each interaction is stamped following the Lamport cock algorithm. The new Lamport timestamps capture the causal relationship between interactions observed during the re-execution within the second computing system.

At block 635, one or more variances in Lamport timestamps are calculated by comparing the Lamport time diagrams of the first and second computing systems. In some embodiments, the variances may be determined by comparing the timestamps of corresponding events in the two diagrams. In some embodiments, the variances may be categorized into two types: macro Lamport variance and micro Lamport variance. In some embodiments, as discussed above, micro Lamport variance may refer to the variance in timestamps obtained by summing up the individual timestamp differences for all the events in a specific test path. In some embodiments, the micro Lamport variance may represent the collective timestamp deviations within a single test path. In some embodiments, the micro Lamport variance may be used to identify if there are significant changes at any point during the re-execution of a specific test path in the second computing system. In some embodiments, as discussed above, macro Lamport variance may refer to the overall variance in Lamport timestamps between the two systems. In some embodiments, when multiple test paths are re-executed (e.g., multiple test paths are aggregated to generate a test workload), the macro Lamport variance may be calculated by summing up the individual timestamp differences across all test paths. In some embodiments, the macro Lamport variance may provide a system-wide view of the differences in the execution of the test workload within the two computing systems. In some embodiments, each of the two types of variance may be used to assess the performance and identify potential overfitting or underfitting between the two systems.

At block 640, the calculated variances are compared to determine whether one or more overfitting criteria are satisfied. In some embodiments, the overfitting criteria may involve setting specific thresholds for either micro or macro Lamport variances. When these overfitting criteria are satisfied (e.g., micro Lamport variance=0, or macro Lamport variance=0), the method proceeds to block 645, where the two computing systems are determined to be overfitting. In some embodiments, overfitting may indicate that the functions in the two systems are considered equal, and the causal relationships between events are maintained, even when they are executed in different systems. In some embodiments, the equality of functions may refer that the two systems produce the same output when receiving the same inputs. In some embodiments, overfitting may suggest that the two computing systems are behaving almost identically in terms of event sequencing and causality. Specifically, in some embodiments, when the overfitting criteria are set up such that the macro Lamport variance is equal to zero, overfitting may indicate that, across all test paths executed, the interactions or events are processed in the same order within the two systems, despite any differences in their configuration or the network conditions, the causal relationships between interactions or events are being maintained consistently in both systems, and/or there are no significant bottlenecks, defects, or issues in either system that would cause a divergence in the Lamport timestamps. In some embodiments, the overfitting threshold may be set such that the macro Lamport variance is equal to a small and non-zero value. In such a configuration, overfitting may suggest that the two computing systems are functionally equivalent and perform similarly, even if there are minor differences in event sequencing and causality. Additionally, in some embodiments, the macro Lamport variance may be used to determine the average reliability and resilience of the systems for a set of testing cases. By setting up a small and non-zero value as the threshold, the reliability of the second computing system may be evaluated. For example, if the overfitting criteria are satisfied (e.g., the macro Lamport variance is lower than the small and non-zero value), it may suggest that the second computing system has a high degree of reliability and resilience, as the second computing system is able to maintain similar causal relationships and sequencing of events as the first computing system, despite minor variations.

If these overfitting criteria are not satisfied, the method then proceeds to block 650, where an underfitting analysis is performed. Within the underfitting analysis, one or more underfitting criteria may be established to determine whether the differences in Lamport timestamps between the two systems are significant enough to conclude that they are functionally dissimilar, and therefore underfitting. In some embodiments, the underfitting criteria may involve setting specific thresholds (e.g., non-zero values) for either micro or macro Lamport variances, to indicate the acceptable variances in Lamport timestamps that do not affect the overall functionality or performance of the system. If the underfitting criteria are satisfied (e.g., macro Lamport variance surpasses the non-zero value), it may indicate that the two systems are functionally dissimilar, and the second computing system is unsuitable or unreliable for a given test workload.

Figure 7:
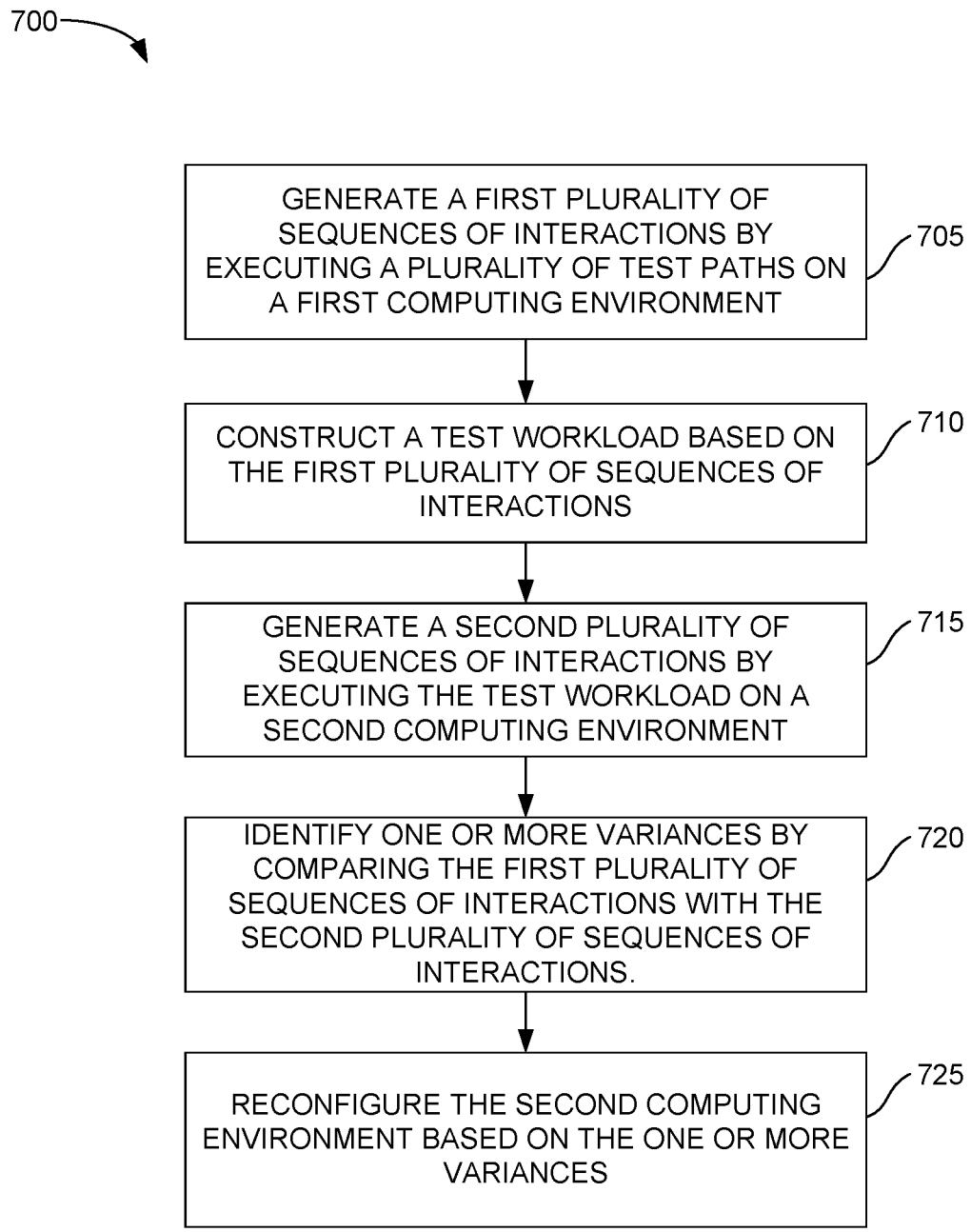
FIG. 7 is a flow diagram depicting an example method for dynamic testing, according to some embodiments of the present disclosure.

FIG. 7 is a flow diagram depicting an example method for dynamic testing, according to some embodiments of the present disclosure.

The method 700 begins at block 705, where a system (e.g., the computer 101 of FIG. 1, or the computing device 800 of FIG. 8) generates a first plurality of sequences of events (e.g., 300 of FIG. 3) by executing a plurality of test paths on a first computing environment. In some embodiments, each respective sequence of events of the first plurality of sequences of events may comprise an order of timestamps (e.g., 305-375 of FIG. 3), each timestamp (e.g., 305-375 of FIG. 3) corresponding to a respective testing operation performed during executing a respective test path on the first computing environment.

At block 710, the system constructs a test workload (as depicted in FIG. 4, where the test workload is generated based on a single Lamport tree 400) based on the first plurality of sequences of events. In some embodiments, the test workload may comprise one or more binary trees (e.g., Lamport tree 400 of FIG. 4), each respective binary tree corresponding to a respective test path of the plurality of test paths. In some embodiments, the test workload may comprise one or more binary trees, each respective binary tree corresponding to a combination of at least two respective test paths of the plurality of test paths.

At block 715, the system generates a second plurality of sequences of events (e.g., 500 of FIG. 5) by executing the test workload on a second computing environment. In some embodiments, each respective sequence of events of the second plurality of sequences of events may comprise an order of timestamps (e.g., 505-590 of FIG. 5), each timestamp (e.g., 505-590 of FIG. 5) corresponding to a respective testing operation performed during executing a respective binary tree on the second computing environment.

At block 720, the system identifies one or more variances by comparing the first plurality of sequences of events with the second plurality of sequences of events (as depicted at block 635 of FIG. 6). In some embodiments, the one or more variances may comprise a macro variance, where the macro variance may comprise a difference between timestamps associated with the first plurality of sequences of events and timestamps associated with the second plurality of sequences of events. In some embodiments, the one or more variances may comprise a micro variance, where the micro variance may comprise a difference between timestamps associated with a first sequence of events, from the first plurality of sequences of events, and timestamps associated with a second sequence of events, from the second plurality of sequences of events. In some embodiments, the first sequence of events may correspond to a first test path of the plurality of test paths when executed on the first computing environment, and the second sequence of events may correspond to the first test path when executed on the second computing environment. In some embodiments, the method 700 may further comprise comparing the one or more variances with one or more overfitting criteria (as depicted at block 640 of FIG. 6), and upon determining the one or more overfitting criteria are satisfied, determining causality between testing events in the first plurality of sequences of events is maintained in the second plurality of sequences of events (as depicted at block 645 of FIG. 6).

At block 725, the system reconfigures the second computing environment based on the one or more variances.

FIG. 8 depicts an example computing device configured to perform various aspects of the present disclosure, according to one embodiment. Although depicted as a physical device, in some embodiments, the computing device 800 may be implemented using virtual device(s), and/or across a number of devices (e.g., in a cloud environment). The computing device 800 can be embodied as any computing device, such as the computer 101 as illustrated in FIG. 1, the client device 205, the node device 210, and/or the middleware 255 as illustrated in FIG. 2.

As illustrated, the computing device 800 includes a CPU 805, memory 810, storage 815, one or more network interfaces 825, and one or more I/O interfaces 820. In the illustrated embodiment, the CPU 805 retrieves and executes programming instructions stored in memory 810, as well as stores and retrieves application data residing in storage 815. The CPU 805 is generally representative of a single CPU and/or GPU, multiple CPUs and/or GPUs, a single CPU and/or GPU having multiple processing cores, and the like. The memory 810 is generally included to be representative of a random access memory. Storage 815 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 835 (such as keyboards, monitors, etc.) are connected via the I/O interface(s) 820. Further, via the network interface 825, the computing device 800 can be communicatively coupled with one or more other devices and components (e.g., via a network, which may include the Internet, local network(s), and the like). As illustrated, the CPU 805, memory 810, storage 815, network interface(s) 825, and I/O interface(s) 820 are communicatively coupled by one or more buses 830.

In the illustrated embodiment, the memory 810 includes a data collection component 850, a variance calculation component 855, an overfitting/underfitting analysis component 860, and a reporting component 865.

Although depicted as a discrete component for conceptual clarity, in some embodiments, the operations of the depicted component (and others not illustrated) may be combined or distributed across any number of components. Further, although depicted as software residing in memory 810, in some embodiments, the operations of the depicted components (and others not illustrated) may be implemented using hardware, software, or a combination of hardware and software.

In one embodiment, the data collection component 850 may collect timestamp data (e.g., 305-375 of FIG. 3, and 505-590 of FIG. 5) for different events or interactions in the first and second computing systems. In some embodiments, the first computing system (also referred to in some embodiments as the reference system or baseline system) may refer to the system where the initial test paths are executed and corresponding binary trees (also referred to in some embodiments as Lamport tree) are generated. In some embodiments, the first system may refer to a distributed system consisting of one or more nodes (e.g., 301, 302, and 303 of FIG. 3). In some embodiments, the second system may refer to the system where the test workload, which is generated from the binary trees of the first system, is re-executed. In some embodiments, the second system may refer to a distributed system consisting of one or more nodes (e.g., 501, 502, and 503 of FIG. 5).

In one embodiment, the variance calculation component 855 may compute the variances in Lamport timestamps between the two systems. In some embodiments, two types of variances may be calculated: macro Lamport variance and micro Lamport variance. The micro Lamport variance may refer to the variance in timestamps obtained by summing up the individual timestamp differences for all the events in a specific test path. In contrast, the macro Lamport variance may refer to the overall variance in timestamps by summing up the individual timestamp differences across all test paths.

In one embodiment, the overfitting/underfitting analysis component 860 may determine whether overfitting occurs between the two systems by comparing the computed variances with the overfitting criteria from a database. When overfitting criteria are satisfied, the two systems may be determined to be overfitting. As discussed above, the overfitting criteria may involve setting specific thresholds for either micro or macro Lamport variances. For example, in some embodiments, the overfitting criteria may be set up such that the macro Lamport variance is equal to zero. In such a configuration, overfitting may indicate that, across all test paths executed, the interactions or events are processed in the same order within the two systems, despite any differences in their configuration or the network conditions, the causal relationships between interactions or events are being maintained consistently in both systems, and/or there are no significant bottlenecks, defects, or issues in either system that would cause a divergence in the Lamport timestamps. In some embodiments, the overfitting criteria may be set up such that the macro Lamport variance is equal to a small and non-zero value. In such a configuration, overfitting may suggest that the two computing systems are functionally equivalent and perform similarly, even if there are minor differences in event sequencing and causality.

In one embodiment, the overfitting/underfitting analysis component 860 may determine whether underfitting occurs between the two systems by comparing the computed variances with the underfitting criteria from a database. As discussed above, the underfitting criteria may involve setting specific thresholds for either micro or macro Lamport variances, to indicate the acceptable variances in Lamport timestamps that do not affect the overall functionality or performance of the system. In some embodiments, the underfitting criteria may be set up such that the macro Lamport variance is equal to a non-zero value. When the underfitting criteria are satisfied (e.g., the macro Lamport variance surpasses the non-zero value), it may indicate that the first and second systems are functionally dissimilar, and that the second computing system is unsuitable or unreliable for a given test workload.

In one embodiment, when the overfitting and/or underfitting criteria are satisfied, the reporting component 865 may produce reports or alerts to notify the human tester about the potential issues. In some embodiments, the report generated by the reporting component 865 may include all relevant information about the text re-execution, Lamport time diagrams, and the calculated Lamport variances. In some embodiments, the report may include the Lamport trees, the test workload, the calculated micro and macro Lamport variances, a comparison of the Lamport timestamps for each event or interaction in the first and second systems, and/or any external or internal factors that might contribute to the variances. In some embodiments, the reporting component 865 may create visual representations of the data, such as a graph or a line chart, to help the testers to better understand the nature and degree of the variances.

In the illustrated example, the storage 815 may include overfitting criteria 870, underfitting criteria 875, historical timestamp data 880, and historical variance data 885. In some embodiments, the aforementioned information may be saved in a remote database (e.g., 270 of FIG. 2) that connects to the computing device 800 via a network.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
generating a first plurality of sequences of events by executing a plurality of test paths on a first computing environment;
constructing a test workload based on the first plurality of sequences of events;
generating a second plurality of sequences of events by executing the test workload on a second computing environment;
identifying one or more variances by comparing the first plurality of sequences of events with the second plurality of sequences of events; and
reconfiguring the second computing environment based on the one or more variances.

2. The method of claim 1, wherein each respective sequence of events of the first plurality of sequences of events comprises an order of timestamps, each timestamp corresponding to a respective testing operation performed during executing a respective test path on the first computing environment.

3. The method of claim 1, wherein the test workload comprises one or more binary trees, each respective binary tree corresponding to a respective test path of the plurality of test paths.

4. The method of claim 1, wherein the test workload comprises one or more binary trees, each respective binary tree corresponding to a combination of at least two respective test paths of the plurality of test paths.

5. The method of claim 1, each respective sequence of events of the second plurality of sequences of events comprises an order of timestamps, each timestamp corresponding to a respective testing operation performed during executing a respective binary tree on the second computing environment.

6. The method of claim 1, wherein the one or more variances comprise a macro variance, wherein the macro variance comprises a difference between timestamps associated with the first plurality of sequences of events and timestamps associated with the second plurality of sequences of events.

7. The method of claim 1, wherein the one or more variances comprise a micro variance, wherein the micro variance comprises a difference between timestamps associated with a first sequence of events, from the first plurality of sequences of events, and timestamps associated with a second sequence of events, from the second plurality of sequences of events.

8. The method of claim 7, wherein the first sequence of events corresponds to a first test path of the plurality of test paths when executed on the first computing environment, and the second sequence of events corresponds to the first test path when executed on the second computing environment.

9. A system comprising:
one or more memories collectively storing computer-executable instructions; and
one or more processors configured to collectively execute the computer-executable instructions and cause the system to:
generate a first plurality of sequences of events by executing a plurality of test paths on a first computing environment;
construct a test workload based on the first plurality of sequences of events;
generate a second plurality of sequences of events by executing the test workload on a second computing environment;
identify one or more variances by comparing the first plurality of sequences of events with the second plurality of sequences of events; and
reconfigure the second computing environment based on the one or more variances.

10. The system of claim 9, wherein each respective sequence of events of the first plurality of sequences of events comprises an order of timestamps, each timestamp corresponding to a respective testing operation performed during executing a respective test path on the first computing environment.

11. The system of claim 9, wherein the test workload comprises one or more binary trees, each respective binary tree corresponding to a respective test path of the plurality of test paths.

12. The system of claim 9, wherein the test workload comprises one or more binary trees, each respective binary tree corresponding to a combination of at least two respective test paths of the plurality of test paths.

13. The system of claim 9, wherein each respective sequence of events of the second plurality of sequences of events comprises an order of timestamps, each timestamp corresponding to a respective testing operation performed during executing a respective binary tree on the second computing environment.

14. The system of claim 9, wherein the one or more variances comprise a macro variance, wherein the macro variance comprises a difference between timestamps associated with the first plurality of sequences of events and timestamps associated with the second plurality of sequences of events.

15. The system of claim 9, wherein the one or more variances comprise a micro variance, wherein the micro variance comprises a difference between timestamps associated with a first sequence of events, from the first plurality of sequences of events, and timestamps associated with a second sequence of events, from the second plurality of sequences of events.

16. A computer program product, comprising:
a computer-readable storage medium having computer-readable program code executable to cause the computer program product to:
generate a first plurality of sequences of events by executing a plurality of test paths on a first computing environment;
construct a test workload based on the first plurality of sequences of events;
generate a second plurality of sequences of events by executing the test workload on a second computing environment; and
identify one or more variances by comparing the first plurality of sequences of events with the second plurality of sequences of events;
reconfigure the second computing environment based on the one or more variances; and one or more processors, each processor of which is configured to execute at least a respective portion of the computer-readable program code.

17. The computer program product of claim 16, wherein each respective sequence of events of the first plurality of sequences of events comprises an order of timestamps, each timestamp corresponding to a respective testing operation performed during executing a respective test path on the first computing environment.

18. The computer program product of claim 16, wherein the test workload comprises one or more binary trees, each respective binary tree corresponding to a respective test path of the plurality of test paths.

\* \* \* \* \*